Dec. 18, 1962  W. G. MOEHLENPAH ET AL  3,068,484
APPARATUS FOR FABRICATING WOOD STRUCTURES
Filed Dec. 13, 1961  7 Sheets-Sheet 1
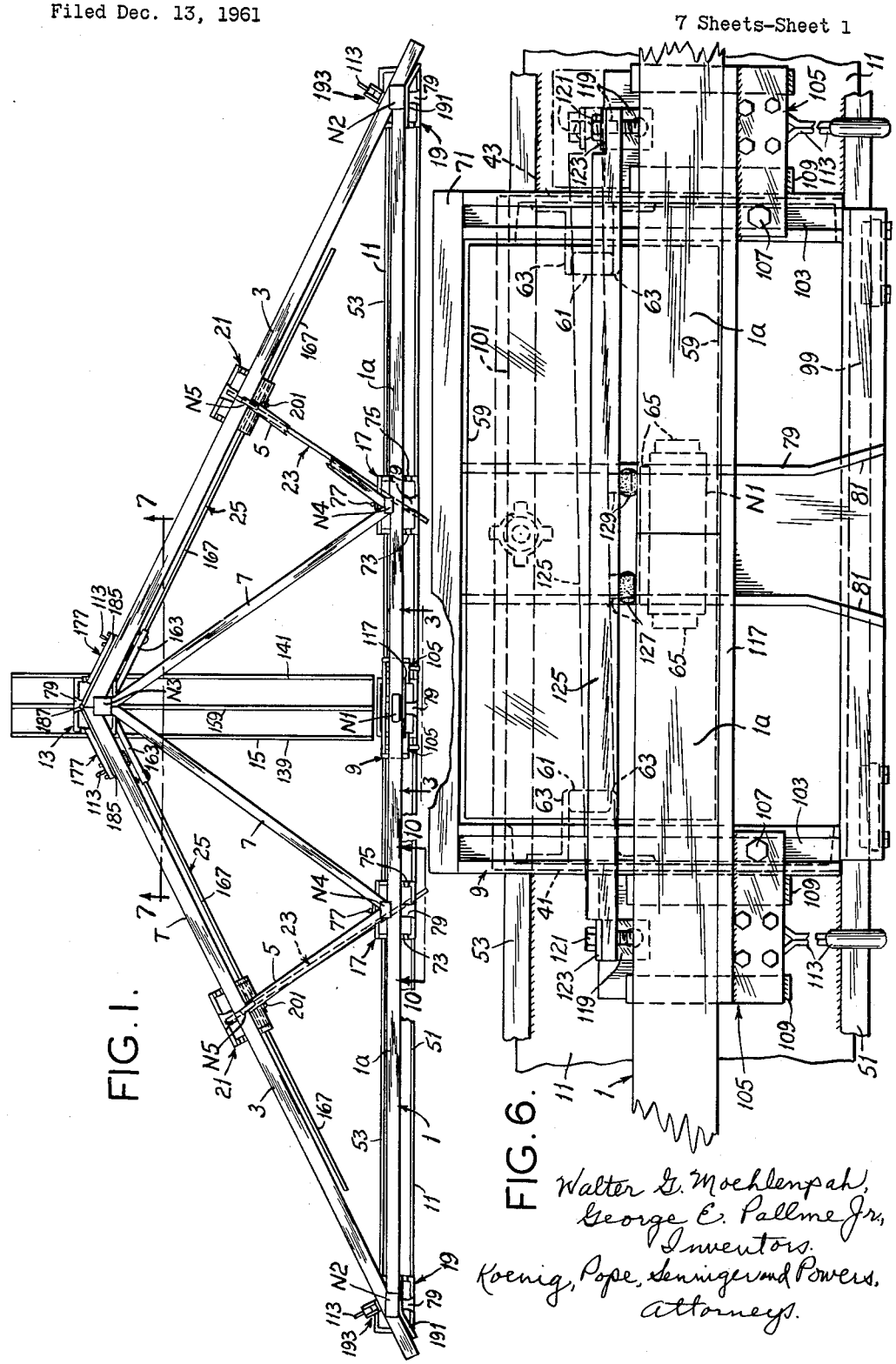

Dec. 18, 1962 W. G. MOEHLENPAH ET AL 3,068,484
APPARATUS FOR FABRICATING WOOD STRUCTURES
Filed Dec. 13, 1961 7 Sheets-Sheet 2
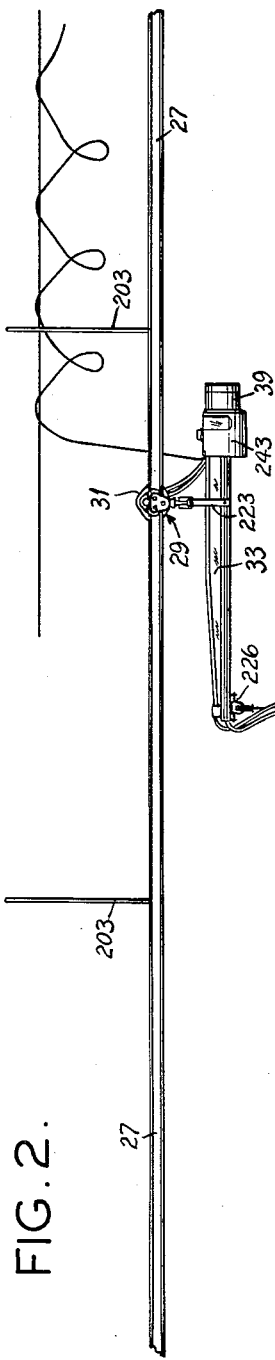
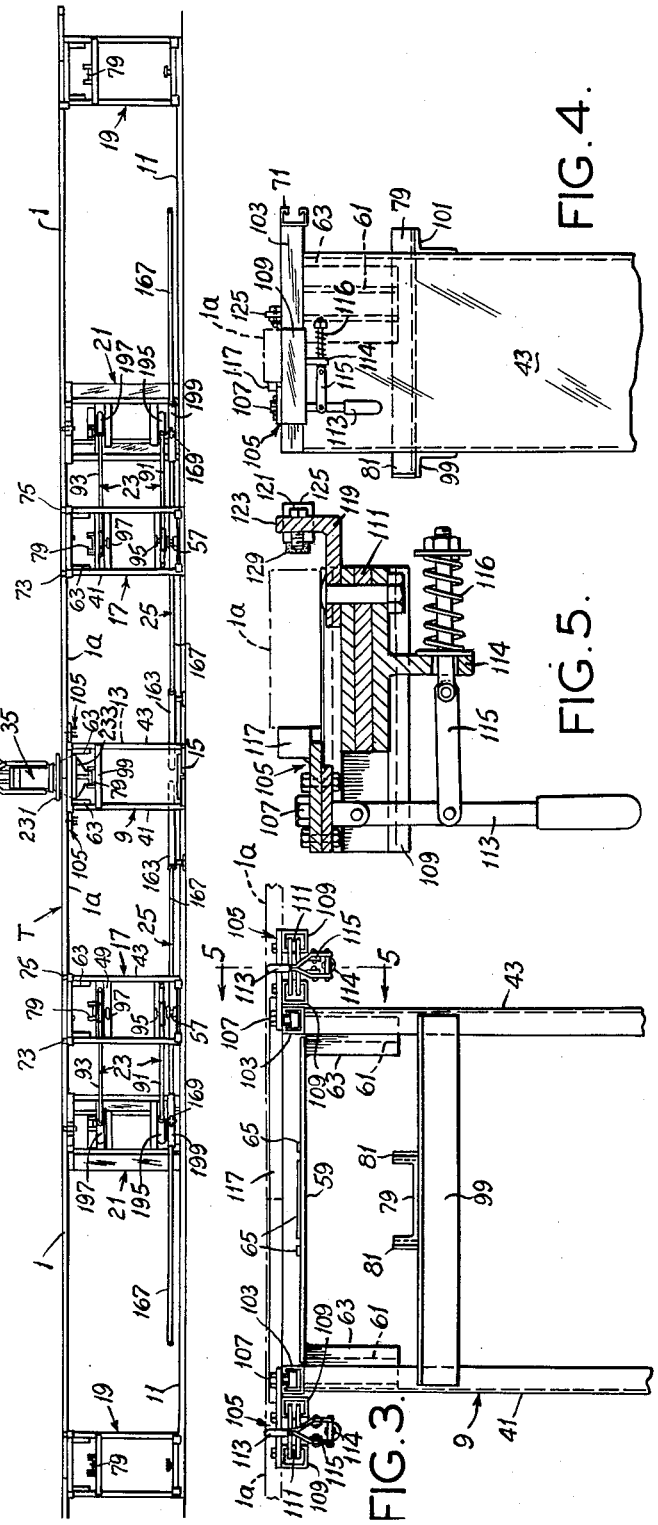

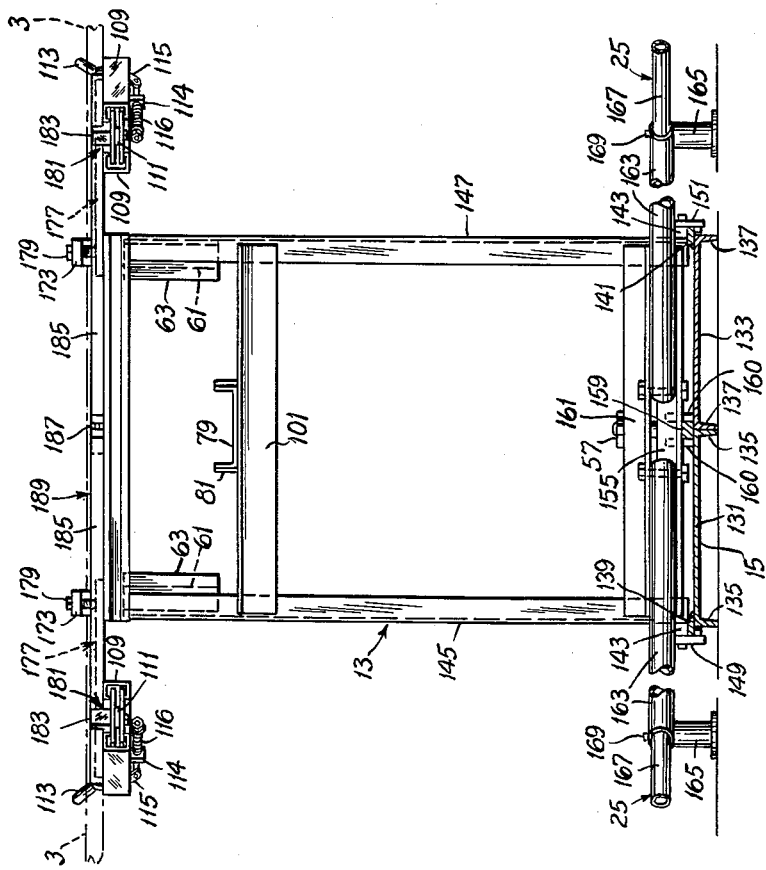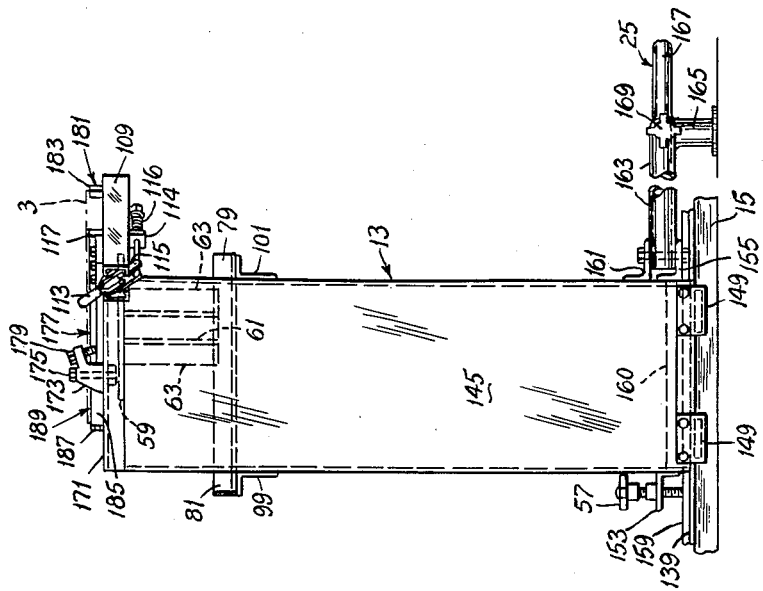

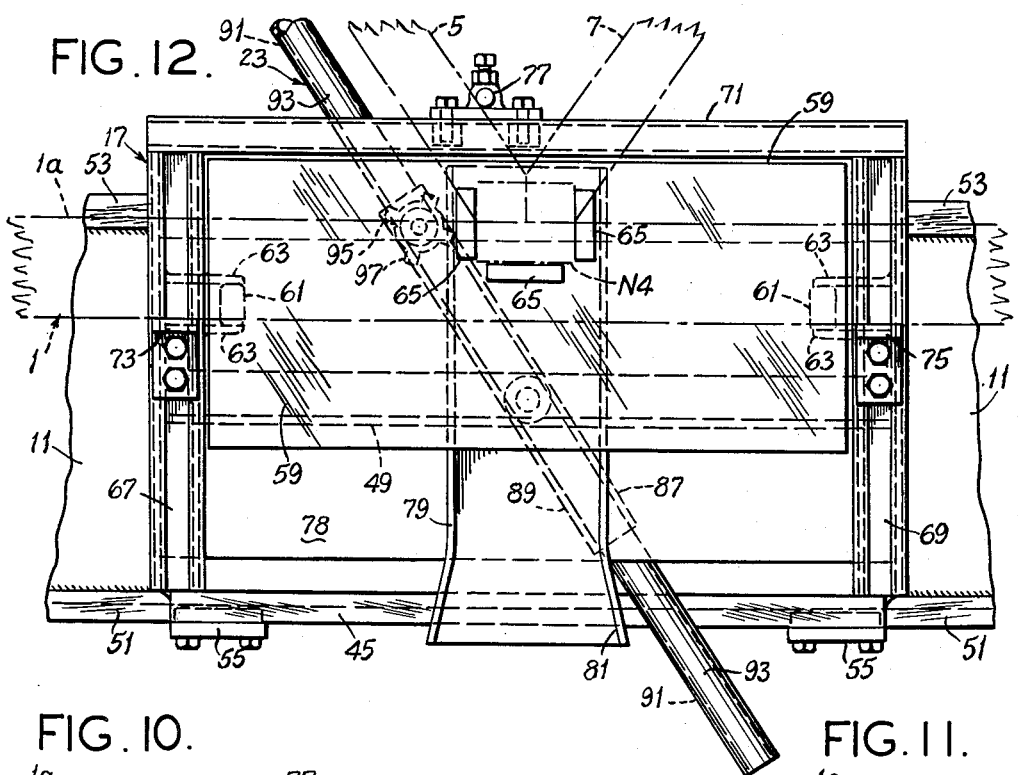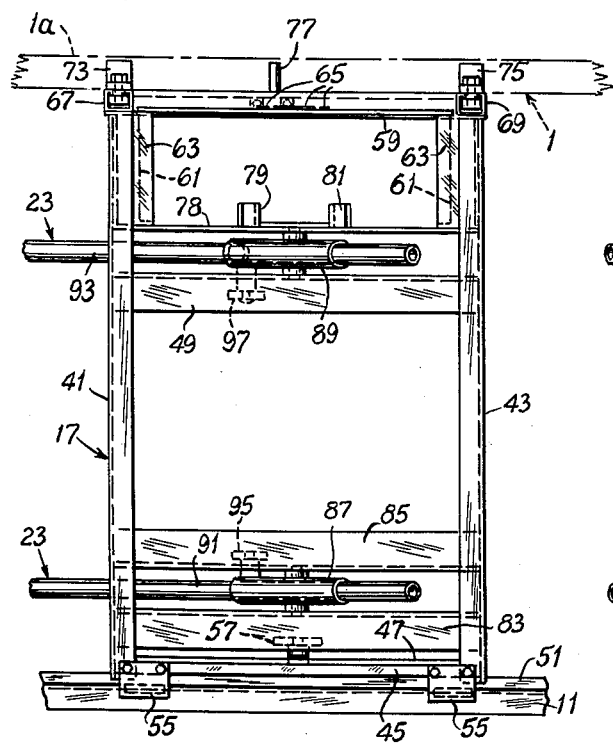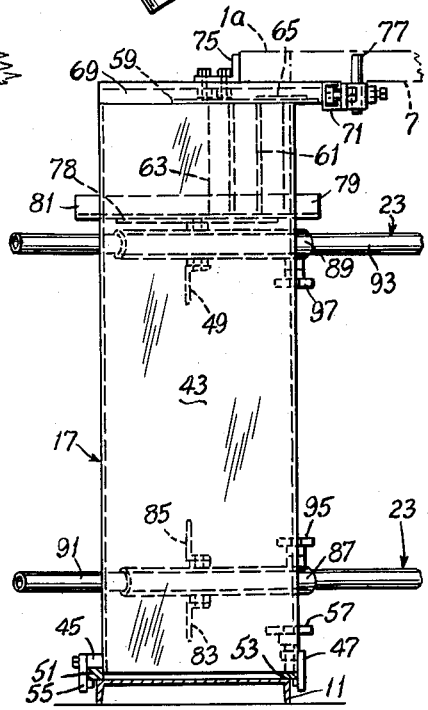

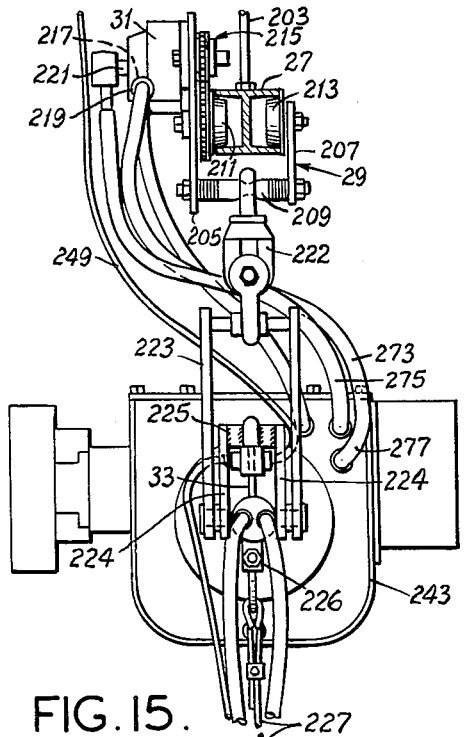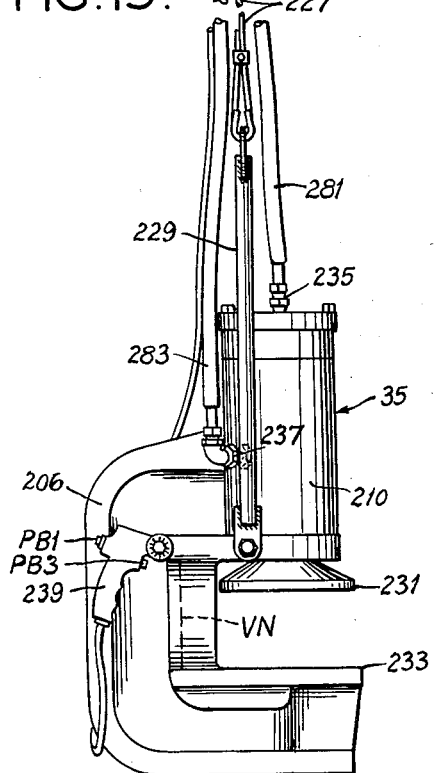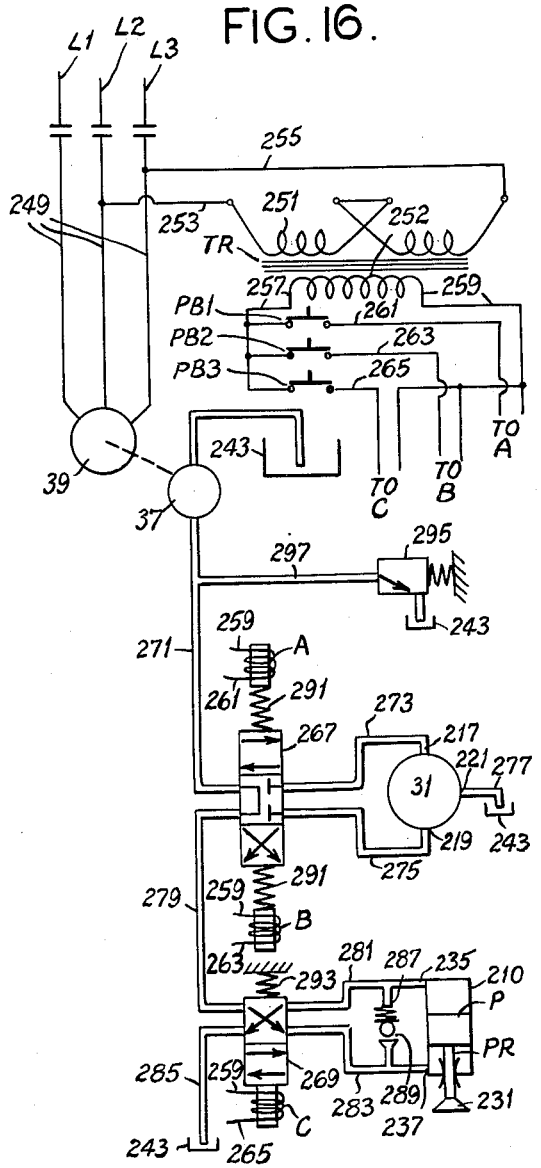

United States Patent Office 3,068,484
Patented Dec. 18, 1962

3,068,484
APPARATUS FOR FABRICATING WOOD STRUCTURES
Walter G. Moehlenpah, Ladue, and George E. Pallme, Jr., St. Louis County, Mo., assignors to Hydro-Air Engineering, Inc., St. Louis, Mo., a corporation of Missouri
Filed Dec. 13, 1961, Ser. No. 158,990
13 Claims. (Cl. 1—149)

This invention relates to apparatus for fabricating wood structures, and more particularly to apparatus for fabricating wood roof trusses.

This is a continuation-in-part application of our copending application Serial No. 95,356, filed March 13, 1961, entitled Apparatus for Fabricating Wood Structures.

It will be understood that wood roof trusses are widely used in residential and commercial building construction. One such type of truss is a triangular truss consisting of a lower chord, upper chords joined to the ends of the lower chord at the heels of the truss and joined together at the peak of the truss, web members constituting compression members or struts extending from the third points of the lower chord to the midpoints of the upper chords, and web members constituting tension members or ties extending from the third points of the lower chord to the peak. This type of truss is commonly referred to as a W truss. The lower chord may consist of two lengths of lumber positioned end-to-end and spliced together at the center of the length of the lower chord. Other well known types of trusses are the hip truss, the king post and the scisors truss.

This invention is concerned with apparatus for fabricating such trusses, which functions as a jig for preliminary assembly of pre-cut lower chord, upper chord and web members of a W, hip, king post or scisors truss, which is provided with means for positioning and holding nailing plates in position to be driven into the truss members at the intersections thereof, and which is provided with movable press means for driving the nailing plates into the truss members to fasten them together, among the several objects of this invention, in addition to the objects set forth in the above application, being the provision of apparatus of the class described having novel clamping apparatus for clamping the truss members in position; the provision of such apparatus having an advantageous means for stabilizing the movable press means to prevent erratic and uncontrollable movement thereof; and the provision of apparatus of this class which is relatively economical in construction and reliable in operation. In one embodiment of the apparatus, a special hydraulic press system is used for driving the nailing plates into the truss members, and it is contemplated that this hydraulic press system may be useful for purposes other than wood truss fabrication. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a plan view of the jig assembly apparatus of this invention set up for the fabrication of a W truss, with the truss members and nailing plates in position to be joined, parts of the truss mmebers being broken away for clarity;

FIG. 2 is a rear elevation of the complete apparatus of this invention, including the hydraulic press system;

FIG. 3 is an enlarged elevation of the splice pedestal of the apparatus taken on line 3—3 of FIG. 1, certain parts removed to reduce the height of the view and the truss members being shown by broken lines;

FIG. 4 is a side elevation of the splice pedestal shown in FIG. 3, parts being in a moved position;

FIG. 5 is an enlarged section taken on line 5—5 of FIG. 3, parts being in a moved position;

FIG. 6 is an enlarged plan view of the splice pedestal shown in FIG. 3, the truss members being shown in solid lines;

FIG. 7 is an enlarged elevation of the peak pedestal of the apparatus taken on line 7—7 of FIG. 1, the truss members being shown in broken lines;

FIG. 8 is a side elevation of the peak pedestal shown in FIG. 7;

FIG. 10 is an enlarged elevation of one of the lower chord pedestals of the apparatus taken on line 10—10 of FIG. 1, the truss members being shown in broken lines;

FIG. 11 is a side elevation of the lower chord pedestal shown in FIG. 10;

FIG. 12 is an enlarged plan view of the lower chord pedestal shown in FIG. 10;

FIG. 15 is an end view of the hydraulic apparatus taken from the left side of FIG. 13; and FIG. 16 is a hydraulic and wiring circuit diagram.

Corresponding reference characters indicate corresponding parts throughout the several views of the drawings.

Figure 9:
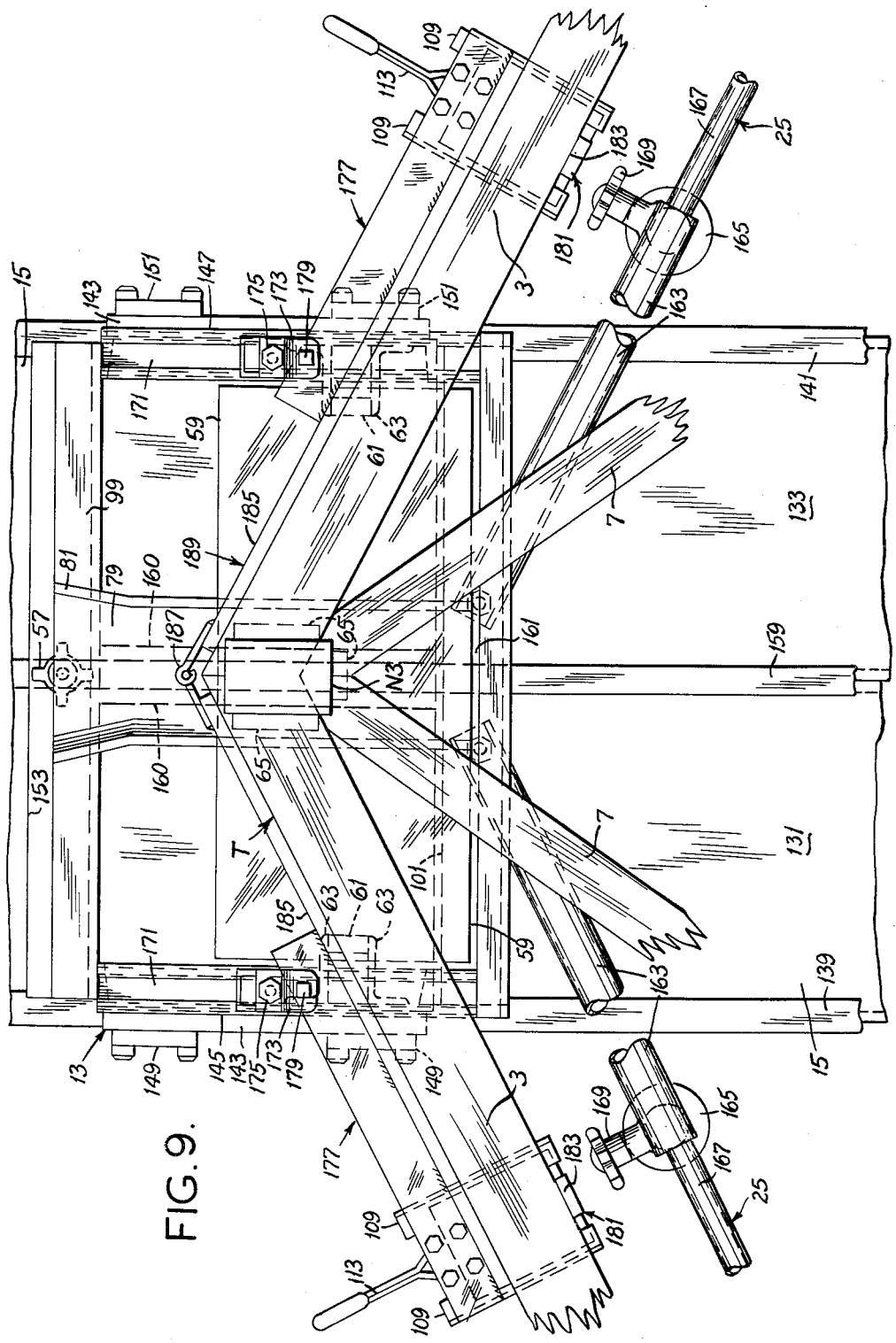
FIG. 9 is an enlarged plan view of the peak pedestal shown in FIG. 7, the truss members being shown in solid lines.

Referring to the drawings, FIG. 1 shows an apparatus constructed in accordance with this invention arranged for assembling and nailing pre-cut wood members to form a triangular or W roof truss T. As shown, truss T comprises a lower chord 1, upper chord members 3 which intersect at the peak of the truss, web members or struts 5 which extend between the third points on the lower chord to the midpoints of the upper chords, and web members or ties 7 which extend between the third points of the lower chord and the peak of the truss. The lower chord 1 is shown as consisting of two pieces, each designated 1a, which are to be spliced in end-to-end butting relation at the center of the lower chord of the truss by lower chord nailing plates such as indicated by N1, one on each face of the truss. These plates are hereinafter referred to as lower chord splice nailing plates. The outer ends of the lower chord members 1a are to be fastened to the upper chords 3 by nailing plates such as indicated at N2, one on each face of the truss. These plates are hereinafter referred to as heel nailing plates. The upper ends of the upper chords 3 and the ties 7 are to be fastened together by nailing plates such as indicated at N3, one on each face of the truss. These plates N3 are hereinafter referred to as peak nailing plates. The lower ends of the struts 5 and ties 7 are to be fastened to the lower chord by nailing plates such as indicated at N4, one on each face of the truss. Plates N4 are hereinafter referred to as lower chord nailing plates. The upper ends of the struts 5 are to be fastened to the upper chords 3 by nailing plates such as indicated at N5, one on each face of the truss. Plates N5 are hereinafter referred to as upper chord nailing plates.

Apparatus constructed in accordance with this invention for assembling and nailing pre-cut wood members to form a W truss is shown to comprise a first pedestal designated in its entirety by the reference chacacter 9. This pedestal, hereinafter referred to as the splice pedestal, is slidable sidewise of the truss on a lower track generally indicated at 11. The splice pedestal 9 is adapted to support the lower chord members at the butting ends thereof and holds the lower splice nailing plate N1 in position to be driven into both lower chord members.

At reference numeral 13 is another pedestal, hereinafter referred to as the peak or top center pedestal, slidable heightwise of the truss on a center track 15. Peak pedestal 13 is adapted to support the upper chord members at the peak or top center of the truss. The lower peak nailing plate N3 is adapted to be supported by peak pedestal 13.

The lower chords 1a and the lower ends of truss members 5 and 7 are supported by pedestals 17, hereinafter referred to as lower chord pedestals, which pedestals are slidable on track 11. Pedestals 17 are adapted to hold the lower nailing plates N4 in position to be driven into the intersection of members 1a, 5 and 7. Pedestals 19, hereinafter referred to as heel pedestals and also slidable on track 11, are for holding the lower chord members 1a and upper chord members 3 in position to be connected by nailing plates N2. Pedestals 19 are adapted to hold the lower of plates N2 in position to be driven into members 1a and 3.

At numeral 21 are indicated upper chord pedestals which are slidably mounted on the floor, and are adapted to support the upper chord members 3 and the upper ends of members 5 at the intersection thereof. The lower nailing plates N5 are adapted to be supported in position to be driven into members 3 and 5 by upper chord pedestals 21. Pedestals 21 are adapted when moved to the desired position to be rigidly clamped at these positions by locking extensible and telescoping links 23 and 25.

Referring to FIGS. 2, and 13–15, a hydraulic press system of this apparatus is shown to include a track or I-beam 27, a carriage 29 movable along the track, a hydraulic motor 31 for driving the carriage in one direction or another along the track, a hangar beam 33 suspended from the carriage, a hydraulic press 35 suspended from the beam and adapted for driving the nailing plates, a hydraulic pump 37 for pumping hydraulic fluid to both the motor and press, and an electric motor 39 for driving pump 37.

Each of the lower chord pedestals 17 is shown in FIGS. 10–12 to be of generally rectangular box shape and has two side walls 41 and 43 joined together by steel bars 45, 47, 49, fastened to the walls by welding, for example. Channel-shaped track 11 has rails 51 and 53 extending along the length thereof on which pedestal 17 is supported. Bar 47 engages the bottom and side of rail 53, and bar 45 has a pair of hooked members 55 engaging the side and bottom of rail 51. A manually operated locking screw 57 attached to bar 47 may be loosened for permitting movement of the pedestal along the track. When the screw 57 is tightened pedestal 17 is locked to the track 11.

At the upper end of pedestal 17 and extending between walls 41 and 43 is a locating tray 59. Tray 59 has a downwardly extending plunger 61 at each side thereof slidably received in guide members 63 attached to the side walls. Locating strips 65 are attached to tray 59 for locating the lower nailing plate N4. Tray 59 is biased downwardly by gravity. Channel-shaped guides 67, 69 and 71 are located at the upper edge of the pedestals 17 on three sides thereof. Aligning members 73 and 75 slidably mounted in guides 67 and 69, respectively, are adapted to be locked in position to abut the lower edges of truss members 1a for aligning said members. An aligning pin 77 is slidably attached to guide 71 and is adapted to be locked in a position for engaging one side of truss members 5.

Spaced below tray 59 is a shelf 78 extending between walls 41 and 43. Attached to the upper surface of shelf 78 is a channel-shaped guide track 79 having a bottom and flanges which are flared outwardly away from each other at the outer ends 81 thereof. Tracks 79, as will become apparent hereinafter, provide for quick and easy positioning of the press 35.

Angle-iron members 83, 85, and members 49, 78 pivotally support connectors or sleeves 87 and 89 through which pass pipes 91 and 93. Manually operable screws 95 and 97 extend through sleeves 87 and 89 for locking pipes 91 and 93 in a fixed position relative to the sleeves. Links 23 are telescoping pipes 91 and 93, the purpose of which will hereinafter become apparent, and extend toward upper pedestals 21.

The upper portion of splice pedestal 9 is shown in FIGS. 3–6. An enlarged view of pedestal 9 is not shown because the lower portion thereof is generally of the same construction as lower chord pedestals 17, i.e., pedestal 9 is mounted on track 11 in the same manner as pedestals 17. Press guide track 79 is mounted on two angle irons 99, 101, rather than on a shelf as is the track 79 of pedestals 17. Tray 59 of the splice pedestal 9 is mounted in the same manner as the tray 59 of the pedestals 17 and has locating strips 65 thereon for positioning nailing plates N1.

Mounted at the upper lateral edges of pedestal 9 are two guides 103 (FIG. 6). A clamping apparatus 105 is slidably attached to each guide 103 and may be rigidly attached to the guide by tightening locking bolt 107. Each clamping apparatus includes a double-channel member 109 in which is slidably mounted a composite plate 111. Pivotally attached to the other end of member 109 is a lever 113. A link 115 extends from lever 113 through a projection 114 on plate 111. A spring 116 located between the inner end of link 115 and projection 114 pushes the inner end of link 115 away from projection 114. Upon swinging lever 113 from a lower position to a raised position plate 111 is moved toward the lever, i.e., in an outward direction relative to the pedestal.

Extending above and across pedestal 9 and attached, as by welding for example, to each clamping apparatus 105 is a steel bar or jaw 117. Bar 117 is adapted to abut the rear sides of truss members 1a. An L-shaped member 119 is pivotally attached to the plate 111 and rests on the upper surface thereof. A bolt 121 extends through the upstanding leg 123 of members 119. Members 119 are of such a construction that by rotating them 180° either a two-by-six or a two-by-four inch timber may be clamped by clamping apparatus 105. A steel bar or jaw 125 is attached to and extends between the bolts 121 of the spaced clamping apparatus. Two rubber bumpers 127, 129 are located centrally of the bar 125 and extend toward the truss members 1a. Bumper 127 is adapted to frictionally engage one member 1a and bumper 129 is adapted to engage the other member 1a. By this clamping arrangement one of the members 1a, for example the left-hand members as viewed in FIG. 6, may be placed upon pedestal 9 and the lever 113 of the clamping apparatus adjacent the member 1a may be moved from a lower to a raised position. This causes the bolt 121 to be moved into engagement with the member 1a thereby forcing it against bar 117. At the same time bumper 127 moves against the member 1a adjacent its inner end (see dotted line indication of bar 125 and bumper 127 in FIG. 6). However, since the right-hand end of bar 125 has not been moved, sufficient space is left for insertion of the right-hand member 1a without affecting the position of the left-hand member 1a. After the right-hand member 1a is inserted the lever 113 of the right-hand clamping apparatus may be moved from a lower position to a raised position to bring the bumper 129 into engagement with the member 1a, thus forcing the latter against bar 117. The bumpers 127, 129 frictionally hold the adjacent ends of the members 1a in end-to-end abutting relation.

Peak or top center pedestal 13 (FIGS. 7–9) is slidably mounted on track 15. Track 15 is shown to comprise two channels 131, 133 resting on flanges 135, 137. Rails 139, 141 are attached to the upper outside edges of channels 131, 133, respectively. Bars 143 are attached along the lower ends of side walls 145, 147, and have hooked members 149, 151 engaging the sides and lower surfaces of rails 139, 141. Extending between walls 145, 147 at the lower ends thereof are two angle irons 153, 155. A manually operable locking screw 57 extends through angle iron 153 onto a rail 159 extending along the length of track 15 at the center thereof. Guide members 160 on each side of rails 159 extend from angle iron 153 to angle iron 155 to accurately center the pedestal 13 on track 15.

An angle iron 161 extends between walls 145, 147 a short distance above iron 155. A pair of sleeves 163 are pivotally attached to irons 155, 161 therebetween and extend generally toward upper chord pedestals 21. Each sleeve 163 has a foot member 165 at the outer end thereof resting on the floor. Each link 25 comprises an elongate pipe 167 slidably mounted within each sleeve 163 and is adapted to be locked against movement relative thereto by a locking screw 169.

A press guide track 79 having a flared outer end (the left end as viewed in FIG. 8) is mounted on angle irons 99, 101, and a vertically movable locating tray 59 having locator strips 65 is mounted for movement in the same manner as the track 79 and locating tray 59 of the splice pedestal 9. Channel-shaped guides 171 are located at the upper edge of the pedestal 13 at the lateral edges thereof. Grippers 173 are slidably mounted in guides 171 and may be tightened in any position therealong by locking bolts 175. A removable clamping apparatus 177 is adapted to be rigidly attached to each guide 171 by a locking bolt 179. Each clamping apparatus 177 includes a channel member 109, a composite plate 111, a lever 113, a projection 114 and a spring 116 associated in the same manner as the same members of clamping apparatus 105 on pedestals 9.

An L-shaped member 181 is pivotally attached (FIG. 7) to plate 111 and rests on the upper surface thereof. The upstanding leg 183 of member 181 is adapted to engage the inside of truss member 3 upon movement of lever 113 from a lowered to a raised position. Member 181 may be rotated 180° for accommodating a two-by-four or a two-by-six inch truss member. Bars 185 attached at their outer ends to the two clamping apparatus 177 extend inwardly toward one another. These bars are hinged together at their inner ends as indicated at 187 to form a V-shaped locator 189. The inner surfaces of bars 185 may be roughened or provided with a file surface for frictionally gripping the upper chords 3. By this clamping arrangement the upper chord members 3 having angled abutting ends may be rigidly held in position to have nailing plates N3 driven therein. Moreover, by moving each clamping apparatus 177 relative to locking bolts 179, the angle formed by V-locator 189 may be changed for making trusses having different gable angles.

Heel pedestals 19 are generally similar in construction to pedestal 9, i.e., pedestals 19 are box shaped, have a vertically movable locating tray, a channel shaped press guide track, and are mounted on track 11 in the same manner as pedestal 9. A bar 191 (see FIG. 1) is adapted to abut a lower chord member 1a and a clamp 193 is adapted to engage an upper chord member 3 to clamp the two members 1a and 3 in position to have nailing plates N2 driven therein.

Upper chord pedestals 21 are generally similar to lower chord pedestals 17, but rather than being mounted on any tracks, pedestals 21 are freely slidabe on the floor. Sleeves 195, 197 (FIG. 2) similar to sleeves 87, 89, are attached to the pedestal 21 in the same manner as the sleeves 87, 89 are attached to pedestals 17. Sleeves 195, 197 receive the other ends of pipes 91 and 93 and have locking screws 95, 97 for clamping the pipes and sleeves together. A third sleeve 199 (see FIG. 2) extends between the rear edges of the side walls of pedestal 21 and is rigidly attached thereto. Pipes 167 are adapted to be received within sleeves 199 and clamped thereto by a manually operable locking bolt 169 (FIG. 2).

The upper chord pedestals 21 are also provided with a movable aligning pin 201 (FIG. 1) similar to and mounted in the same manner as pins 77 on pedestals 17. Pins 201 are adapted to engage the sides of truss members 5 opposite to the sides engageable by pins 77, thereby holding the members 5 in their proper position.

Figure 13:
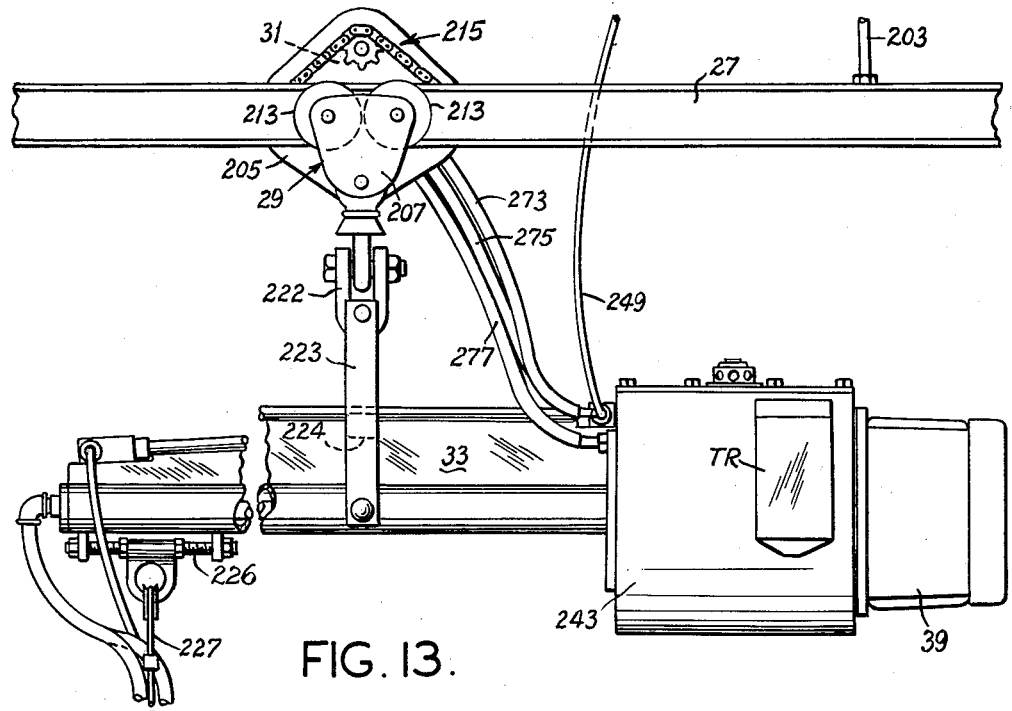
FIG. 13 is an enlarged side elevation of the hydraulic press system of the apparatus of this invention.

The I-beam or track 27, as shown in FIGS. 2 and 13, is suspended from the roof or ceiling (not shown) by a plurality of hangers 203. However, it will be understood that this beam could just as well be supported on columns. The carriage 29 comprises plates 205 and 207 located on opposite sides of track 27 and tied together as indicated at 209 (FIG. 15). Side plate 205 carries wheels 211 and side plate 207 carries wheels 213 riding on the upper surface of the lower flanges of the track 27. Wheels 211 are driven via a chain and sprocket drive 215. Motor 31 is mounted on side plate 205 of the carriage. Motor 31 has three ports 217, 219 and 221. Port 217 is hidden in FIG. 15. Hydraulic fluid under pressure is supplied to port 217 to actuate the motor to drive the carriage in one direction, while supplying fluid to port 219 actuates the motor in reverse direction thereby to drive the carriage in the other direction. Port 221 is a drain port. Hanger beam 33 is suspended from the carriage 29 by a swivel connection 222 which permits the hanger beam to be swung around the carriage a full 360°.

A U-shaped connector member 223 extends through swivel 222 and has legs extending downwardly on both sides of hanger beam 33. Arms 224 are pivotally attached at their lower ends to the lower ends of the arms of connector member 223 and attached to the top of beam 33 as by welding 225.

Hydraulic press 35 is shown in FIGS. 13 and 15 to be supported from a balancing mechanism 226 at one end of the beam 33 by a cable 227 and a U-shaped carrier 229. Press 35 comprises a rectangular movable upper platen 231 and a fixed lower platen 233. The lower platen forms a part of a generally C-shaped press frame 206. A V-shaped notch VN (FIGS. 13 and 15) is provided in the rear side of the throat formed by the upper platen 231 and press frame 206. The lower end of the frame 206 is shaped to conform to the channel guide tracks 79, one of which is shown in broken lines in FIG. 13. Also forming a part of the frame is a hydraulic cylinder 210. A piston P is provided in the cylinder and has a piston rod PR to the lower end of which is fixed the upper platen 231. Hydraulic fluid may be pumped through an inlet 235 to the upper end of the cylinder, thereby forcing the piston and platen 231 downwardly. The piston is raised by forcing fluid through an inlet 237 into the lower end of the cylinder. Handles 239 and 241 (the latter being shown in dotted lines in FIG. 13) are provided on the frame, one on each side thereof. A push button switch PB1 is provided on handle 239 and a similar push button switch PB2 (shown in dotted lines in FIG. 13) is provided on handle 241. A third push button switch PB3 is provided on handle 239. Switches PB1 and PB2 control the movement of carriage 29, while switch PB3 controls movement of the piston and platen 231. Electrical and hydraulic circuits including the switches are hereinafter more fully described.

Figure 14:
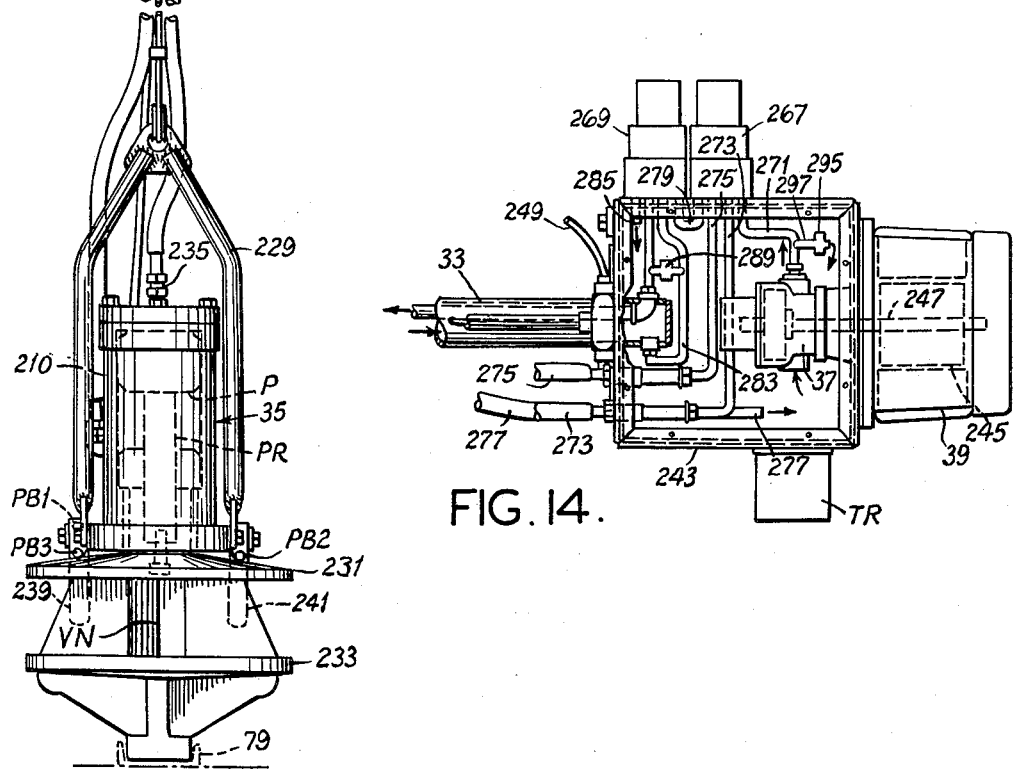
FIG. 14 is a fragmentary plan view of the hydraulic power assembly of the press system shown in FIG. 13, certain parts being removed for clarity.

Hydraulic pump 37 is shown to be mounted in a tank or sump 243 on the right end of the hanger beam 33 as shown in FIG. 14. As shown, pump 37 is a conventional gear pump. However, it will be understood that other types of pumps may be used. The pump 37 supplies hydraulic fluid under pressure to the hydraulic motor 31 and press 35 through suitable line connections as hereinafter discussed in regard to the hydraulic and electrical circuit for operating the hydraulic motor and press.

Electric motor 39 is mounted on tank 243 for driving the pump. The motor is so mounted that the axis of rotation of its rotor or armature 245 and its armature shaft 247 is parallel to the hanger beam 33. The motor is supplied with current from an electrical source (not shown) through line 249. When the motor is energized the rotating armature and armature shaft effect a gyroscopic action which thereby stabilizes the hanger beam 33 and press 35.

The motor is supplied with power from a three-wire source L1, L2 and L3 (FIG. 16). The primary 251 of a step-down transformer TR is connected across lines L2 and L3 by lines 253 and 255. The secondary 252 of transformer TR feeds lines 257 and 259. Switch PB1 is connected across lines 257 and 259 in a line 261 including a solenoid A. Switch PB2 is connected across lines 257 and 259 in a line 263 including a solenoid B. Switch PB3 is connected across lines 257 and 259 in a line 265 including a solenoid C. Solenoids A and B actuate a three-way valve 267 which controls hydraulic motor 31, and solenoid C actuates a two-way valve 269 which controls press cylinder 210. The outlet of pump 37 feeds hydraulic line 271 which leads to valve 267. Line 273 extends from valve 267 to port 217 of the motor 31. Line 275 connects port 219 of motor 31 to valve 267. Line 277 connects relief port 221 of the motor 31 to the tank or sump 243. Line 279 connects valve 267 to valve 269. Line 281 connects valve 269 to the upper end of the press cylinder 210. Line 283 connects the lower end of the press cylinder to valve 269. The lines 281 and 283 are formed in part by the beam 33 which aids in cooling the hydraulic fluid flowing therethrough. Line 285 connects valve 269 to the tank or sump 243. A by-pass line 287 including a check valve 289 interconnects lines 281 and 283. Check valve 289 is adapted to open for flow from line 283 to line 281.

Valve 267 has a normal position in which line 271 is interconnected through the valve with line 279, and lines 273 and 275 are blocked at the valve (FIG. 16). Solenoid A, when energized, moves valve 267 down as viewed in FIG. 16 to a position in which line 271 is interconnected with line 273 and line 275 is interconnected with line 279. Solenoid B, when energized, moves valve 267 up as viewed in FIG. 16 to a position in which line 271 is interconnected with line 275 and line 273 is interconnected with line 279. Valve return springs such as indicated at 291 are provided for returning the valve to a normal position on deenergization of one or the other solenoids.

Valve 269 has a normal position in which line 279 is interconnected with line 283 and line 281 is interconnected with line 285. Solenoid C, when energized, moves valve 269 up as viewed in FIG. 16 to a position in which line 279 is interconnected with line 281 and line 283 is interconnected with line 285. A return spring such as indicated at 293 is provided for returning valve 269 to normal position on deenergization of solenoid C.

While work on trusses is proceeding, pump 37 is continuously driven by motor 39. With switches PB1, PB2 and PB3 open, and solenoids A, B and C deenergized, hydraulic fluid is delivered from pump 37 via line 271, valve 267, line 279, valve 269 and line 283 to the lower end of the press cylinder 210. The upper end of the press cylinder is vented via line 281, valve 269 and line 285. Accordingly, the press piston P and platen 231 are held up, and line 287 including check valve 289 by-passes fluid from line 283 to line 281. To actuate the press (i.e., drive platen 231 downwardly), switch PB3 is closed to energize solenoid C and move valve 269 upwardly as viewed in FIG. 16. Fluid is thereupon delivered via line 271, valve 267, line 279, valve 269, and line 281 to the upper end of the press cylinder 210, and the lower end of the cylinder is vented via line 283, valve 269 and line 285, whereupon the piston and platen 231 are driven downwardly. For pressure relief when the piston reaches the lower limit of its stroke, a pressure relief valve 295 is provided in a line 297 connected to line 271.

To move the carriage 29 to the right as viewed in FIG. 2, switch PB1 is closed to energize solenoid A and move valve 267 downwardly as viewed in FIG. 16. Fluid is thereupon delivered via line 271, valve 267, and line 273 to port 217 of motor 31, and the motor is vented via port 219, line 275, valve 267, line 279, valve 269, line 283, line 287 including check valve 289, line 281, valve 269, and line 285. This drives the motor in such direction as to move the carriage to the right as viewed in FIG. 2. To move the carriage to the left as viewed in FIG. 2, switch PB2 is closed to energize solenoid B and move the valve 267 upwardly as viewed in FIG. 16. Fluid is thereupon delivered via line 271, valve 267, line 275 to port 219 of motor 31, and the motor is vented via port 217, line 273, valve 267, line 279, valve 269, line 283, line 287 including check valve 289, line 281, valve 269 and line 285. This drives the motor in the opposite direction to move the carriage to the left as viewed in FIG. 2.

The apparatus is set up for fabricating a W truss, for example, in the following manner:

The peak, splice, lower chord, and heel pedestals are moved along the tracks 15 and 11 to the desired positions and clamped into position by the respective locking screws 57. At this point the rear ends of pipes 91 and 93 are freely slidable and telescoped within sleeves 87, 89 on lower chord pedestals 17; the forward ends of pipes 91 and 93 are freely slidable and telescoped within sleeves 195, 197 on upper chord pedestals 21; and the pipes 167 are freely slidable and telescoped within sleeves 163 on peak pedestal 13 and freely slidable and telescoped within sleeves 199 on the upper chord pedestals 21. The upper chord pedestals 21 are moved into position for supporting the upper chord members 3 and struts 5 at the intersection thereof. The pipes freely slide within the sleeves as the pedestals 21 are moved into position. Locking bolts 95, 97, 169 are then tightened against the pipes. This provides a rigid linkage for securing pedestals 21 in position.

The bottom nailing plates N1—N5 are then placed on the trays of the several pedestals in the desired position as determined by locator strips 65. One pre-cut lower chord member 1a is placed into position on a heel pedestal, a lower chord pedestal, and the splice pedestal. The clamping apparatus of the splice pedestal is in its open position at this time. Assuming the left-hand member 1a is placed in position, the lever 113 of the left-hand clamping apparatus 105 as shown in FIG. 6 is moved from its lower position to its raised position. This causes the L-shaped member 119, bolt 121 and the left end of bar 125 to be moved against the truss member 1a as shown by the dot-dash lines in FIG. 6. Since the lever 113 of the right-hand clamping apparatus is still in its lower position, the L-shaped member 119 and bolt 121 associated therewith and the right-hand end of bar 125 are still substantially spaced inwardly from the bar 117. The right-hand truss member 1a may then be easily placed in position with its lower end abutting the left-hand chord member 1a without interference from the clamping apparatus. The lever 113 of the right-hand clamping apparatus 105 is then raised and the bolt 121 thereof moves into engagement with member 1a. The resilient bumpers 127, 129 are also moved into engagement with the members 1a to hold the abutting ends thereof in engagement. This function is performed notwithstanding lumber variations because of the resiliency of the bumpers.

Next pre-cut upper chord members 3 are placed in position on peak pedestal 13, upper chord pedestals 21 and heel pedestals 19. Clamps 193 on the heel pedestals 19 are then actuated to push and hold the lower ends of truss members 3 in engagement with the outer ends of truss members 1a. The two clamping apparatus 177 on the peak pedestal 13 are then actuated to move the truss members 3 against V-locator 189 and clamp the angled abutting ends of truss members 3 together.

The struts 5 and ties 7 may then be placed in position on the pedestals. Aligning pins 77 on pedestals 17 and aligning pins 201 on pedestals 21 are positioned on opposite sides of the struts 5 and hold these struts in their proper position.

The top nailing plates N1—N5 are then manually positioned over the joints of the various truss members.

The hydraulic press 35 is then moved by driving the carriage 29 along the track 27 and/or swinging the beam 33 about the carriage to any one of the pedestals. The gyroscopic action of rotating armature 245 and shaft 247 effects a stabilizing action on the beam 33 and press 35 and only a slight manual force need be exerted on the press by the operator to conveniently and precisely control the movement and positioning of the press. The lower forward end of the press 35 is then moved into the press guide track 79 of the pedestal, the flared outer end of track 79 aiding to initially guide the press therein. With the upper platen 231 positioned over the upper nailing plate and the lower platen 233 positioned below the locating tray on which the lower nailing plate is located, switch PB3 is actuated and the upper platen moves downwardly onto the upper nailing plate. The resistance of the upper nailing plate against the truss members causes the lower platen 233 to be raised out of track 79 and against the locating tray and the lower nailing plate is pressed against the truss member. The platens drive the nailing plates into the intersecting truss members. When the upper and lower nailing plates have been fully driven into the truss members, which is a matter of a second or so, the switch PB3 is opened and the press platens separate. The locating tray falls away from the truss member due to gravity.

The press is then moved to each of the other pedestals and the above described operation repeated. The gyroscopic action of the rotating motor armature 245 and shaft 247 tends to prevent erratic and uncontrollable movement during the movement of the press to the various pedestals.

When the press is moved to the peak pedestal 13, the V-shaped notch VN (FIGS. 13 and 15) permits the hinge 187 (FIG. 9) and the adjacent portions of bars 185 to be positioned within the notch VN. The provision of the notch VN thus allows the platens 231 and 233, without being unduly large, to extend over and under, respectively, the complete joint formed by upper chords 3 and web members 7 for driving the nailing plates N3 therein.

While the pedestals are shown to have only a lower locator tray, it is contemplated that locator tray or plate assemblies, having both upper and lower plates such as described in the above application, could be utilized.

It will be understood that the splice pedestal may ride on a track similar to track 15 (heightwise of the truss) so that a scissors truss could be fabricated. Moreover, it is contemplated that the pedestal locking screws 57 could be replaced by vacuum cups, i.e., the vacuum cups could be attached to the pedestals for clamping the latter to the floor in their desired positions.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In apparatus for fabricating wood trusses or the like including an overhead track, a carriage movable in one direction or the other on the track, a beam rotatably suspended from the carriage, a hydraulic press suspended from the beam adapted for driving nailing plates, a hydraulic pump carried by the beam, hydraulic connections between said pump and said press, means on said beam for driving said pump, said driving means including a rotor having its axis of rotation extending in such direction as to gyroscopically stabilize said beam and press.

2. In apparatus for fabricating wood trusses or the like including an overhead track, a carriage movable on the track, a hydraulic motor for driving the carriage in one direction or the other on the track, a beam pivotally suspended from the carriage, a hydraulic press pivotally suspended from one end of the beam adapted for driving nailing plates, a hydraulic pump mounted on the other end of the beam, hydraulic connections between said pump and said hydraulic motor and said press, and an electric motor mounted on said other end of the beam for driving said pump, said electric motor having a rotatable armature and armature shaft, the rotational axis of said armature shaft being parallel to said beam, said armature shaft and armature when rotating effecting a gyroscopic action whereby the beam and said press are stabilized.

3. Apparatus for clamping two truss members in end-to-end abutting relation comprising means for supporting the adjacent ends of the members, a first clamping means on one side of said support means, a second clamping means on the opposite side of said support means, a first bar extending between said clamping means, each of said clamping means including a movable member, a second bar extending between and connected adjacent its ends to said movable members, a pair of resilient bumpers on the second bar spaced from each other and located inwardly of the ends of the second bar, one of said bumpers being adjacent one of said truss members and the other bumper being adjacent the other truss member when the truss members are placed in end-to-end abutting position on the support means, and means for moving said movable members individually toward a truss member located between the bars, whereby the truss members may be securely clamped in position by frictional engagement of the bumpers against the truss members by sequentially actuating said first and second clamping means.

4. Apparatus as set forth in claim 3 wherein each clamping means includes a plate and means mounting said plate for sliding movement, said movable member comprising an L-shaped lug mounted on said plate and adapted for movement relative thereto between a first position wherein said clamping means is adapted for clamping a truss member having one width and a second position wherein said clamping means is adapted for clamping a truss member having another width.

5. Apparatus as set forth in claim 4 including means pivotally attaching said lug to said plate, said lug adapted to be moved from its first position to its second position by rotating the lug approximately 180°.

6. Apparatus for fabricating wood trusses of the type having lower chord members, upper chord members meeting at the peak of the truss, tension members extending from the lower chord members to the peak of the truss, and compression members extending from the lower chord members to the upper chord members, comprising first pedestals for supporting the lower chord, tension and compression members, a second pedestal for supporting the upper chord members and tension members at the peak of the truss, said pedestals adapted to be clamped securely to the floor, third pedestals movably mounted on the floor for supporting the upper chord members and compression members, extensible links interconnecting respective first and third pedestals and pivotally connected at their respective ends to the respective first and third pedestals, and extensible links interconnecting the second pedestal and respective third pedestals and pivotally connected to the second pedestal and having a sliding connection with the respective third pedestals.

7. Apparatus for fabricating wood trusses of the type having lower chord members, upper chord members meeting at the peak of the truss, tension members extending from the lower chord members to the peak of the truss, and compression members extending from the lower chord members to the upper chord members, comprising first pedestals for supporting the lower chord, tension and compression members, a second pedestal for supporting the upper chord members and tension members at the peak of the truss, said pedestals adapted to be clamped securely to the floor, third pedestals movably mounted on the floor for supporting the upper chord members and compression members, means for securing the third pedestals in position comprising first connectors pivotally attached to all of the pedestals, second connectors rigidly attached to the third pedestals, links extending between the pivotal connectors on the first pedestals and the pivotal connectors on the third pedestals, links extending between the pivotal connectors on the second pedestal to the fixed connectors on the third pedestals, and means for clamping the links to the connectors on the pedestals.

8. Apparatus as set forth in claim 7 wherein said connectors comprise tubular sleeves and said links are slidably recived within said sleeves.

9. Apparatus as set forth in claim 7 wherein said links comprise elongate pipes, said clamping means extending through said sleeves and adapted for engagement with said pipes.

10. Apparatus for fabricating wood trusses or the like having a plurality of pedestals for holding truss members in assembled position and for holding nailing plates in position to be driven into the truss members at the intersections thereof utilizing driving means including a C-shaped press mounted for universal movement into position at each of the pedestals and having a fixed lower platen and a movable upper platen, each of said pedestals having guide means for guiding the lower end of said press into position for driving the nailing plates into the truss members.

11. Apparatus as set forth in claim 10 wherein each of said guide means comprises a channel-shaped member having a bottom and two upstanding flanges, said flanges flaring away from each other at the outer end of the guide means for initially guiding the press into the channel-shaped member.

12. Apparatus for fabricating wood trusses having a plurality of pedestals for supporting the truss members in assembled position, each of said pedestals including a tray for holding a nailing plate in position to be driven into the intersection of members positioned thereabove utilizing driving means including a C-shaped press mounted for universal movement into position at each of the pedestals, means mounting said tray for vertical movement, fixed support means spaced below the tray, and guide means on said fixed support means for guiding the lower portion of said C-shaped press into position for driving said tray upwardly to drive the nailing plate on said tray into the truss members.

13. Apparatus as set forth in claim 12 wherein said guide means comprises a channel-shaped track having a flared opening at its outer end for initially guiding the lower end of the press into the track.

References Cited in the file of this patent

UNITED STATES PATENTS

| | | |
|---|---|---|
| 809,882 | Wrigley | Jan. 9, 1906 |
| 873,077 | Patnod | Dec. 10, 1907 |
| 2,540,106 | Eichelberger | Feb. 6, 1951 |
| 2,552,304 | Arter | May 8, 1951 |
| 2,936,803 | Jarick | May 17, 1960 |
| 2,941,557 | Baprawski | June 21, 1960 |

UNITED STATES PATENT OFFICE
CERTIFICATE OF CORRECTION

Patent No. 3,068,484                                              December 18, 1962.

Walter G. Moehlenpah et al.

It is hereby certified that error appears in the above numbered patent requiring correction and that the said Letters Patent should read as corrected below.

In the grant, lines 2 to 4, for "assignors to Hydro-Air Engineering, Inc., of St. Louis, Missouri, a corporation of Missouri," read -- assignors, by mesne assignments, to Ar-Ka Engineering, Inc., of St. Louis, Missouri, a corporation of Delaware, --; line 13, for "Hydro-Air Engineering, Inc., its successors" read -- Ar-Ka Engineering, Inc., its successors --; in the heading to the printed specification, lines 5 and 6, for "assignors to Hydro-Air Engineering, Inc., St. Louis, Mo., a corporation of Missouri" read -- assignors, by mesne assignments, to Ar-Ka Engineering, Inc., St. Louis, Mo., a corporation of Delaware --.

Signed and sealed this 23rd day of April 1963.

(SEAL)
Attest:
ERNEST W. SWIDER
Attesting Officer

DAVID L. LADD
Commissioner of Patents